(12) United States Patent
Oberheide et al.

(10) Patent No.: US 8,892,885 B2
(45) Date of Patent: Nov. 18, 2014

(54) SYSTEM AND METHOD FOR DELIVERING A CHALLENGE RESPONSE IN AN AUTHENTICATION PROTOCOL

(75) Inventors: Jon Oberheide, Ann Arbor, MI (US); Douglas Song, Ann Arbor, MI (US); Adam Goodman, Bloomfield Hills, MI (US)

(73) Assignee: Duo Security, Inc., Ann Arbor, MI (US)

( * ) Notice: Subject to any disclaimer, the term of this patent is extended or adjusted under 35 U.S.C. 154(b) by 38 days.

(21) Appl. No.: 13/601,431

(22) Filed: Aug. 31, 2012

(65) Prior Publication Data

US 2013/0212387 A1 Aug. 15, 2013

Related U.S. Application Data

(60) Provisional application No. 61/529,375, filed on Aug. 31, 2011.

(51) Int. Cl.
*H04L 29/06* (2006.01)
*H04L 9/32* (2006.01)

(52) U.S. Cl.
CPC .............. *H04L 63/08* (2013.01); *H04L 63/12* (2013.01); *H04L 63/0428* (2013.01); *H04L 9/32* (2013.01); *H04L 63/06* (2013.01); *H04L 63/168* (2013.01)
USPC ........................................ 713/168; 713/151

(58) Field of Classification Search
CPC ....... H04L 63/08; H04L 63/168; H04L 29/06; H04L 9/32; H04L 63/12; H04L 63/0428; H04L 63/06
USPC ................................................ 713/151, 168
See application file for complete search history.

(56) References Cited

U.S. PATENT DOCUMENTS

| | | | |
|---|---|---|---|
| 6,823,359 B1 | 11/2004 | Heidingsfeld et al. | |
| 6,934,858 B2 | 8/2005 | Woodhill | |
| 7,447,784 B2 | 11/2008 | Eun | |
| 7,463,637 B2 | 12/2008 | Bou-Diab et al. | |
| 7,574,733 B2 | 8/2009 | Woodhill | |
| 7,982,595 B2 | 7/2011 | Hanna et al. | |
| 8,136,148 B1 | 3/2012 | Chayanam et al. | |
| 8,161,527 B2 | 4/2012 | Curren | |
| 8,332,627 B1 | 12/2012 | Matthews et al. | |
| 8,402,526 B2 | 3/2013 | Ahn | |
| 8,495,720 B2 | 7/2013 | Counterman | |
| 8,499,339 B2 | 7/2013 | Chao et al. | |
| 2003/0126472 A1 | 7/2003 | Banzhof | |
| 2005/0268107 A1 | 12/2005 | Harris et al. | |
| 2006/0130139 A1 | 6/2006 | Sobel et al. | |
| 2007/0199060 A1 | 8/2007 | Touboul | |
| 2009/0187986 A1* | 7/2009 | Ozeki | 726/21 |
| 2010/0042954 A1 | 2/2010 | Rosenblatt et al. | |
| 2010/0114740 A1 | 5/2010 | Dominguez et al. | |

(Continued)

*Primary Examiner* — Kambiz Zand
*Assistant Examiner* — Tongoc Tran
(74) *Attorney, Agent, or Firm* — Jeffrey Schox; Brian Van Osdol

(57) ABSTRACT

A system and method for authenticating a user that includes receiving an access-request of a network protocol at a challenge-response server; determining if an access-challenge message is required; delivering an active script component through a parameter of an access-challenge message of the network protocol when an access-challenge is required; receiving a challenge-response of a user; validating the challenge-response; and selectively sending an access-accept response for a valid challenge-response and sending an access-denied response for an invalid challenge-response.

14 Claims, 3 Drawing Sheets

(56) References Cited

U.S. PATENT DOCUMENTS

| | | |
|---|---|---|
| 2010/0115578 A1 | 5/2010 | Nice et al. |
| 2010/0121767 A1 | 5/2010 | Coulter et al. |
| 2010/0216425 A1 | 8/2010 | Smith |
| 2011/0138469 A1 | 6/2011 | Ye et al. |
| 2011/0197267 A1 | 8/2011 | Gravel et al. |
| 2011/0219449 A1 | 9/2011 | St. Neitzel et al. |
| 2012/0090028 A1* | 4/2012 | Lapsley et al. ................ 726/22 |
| 2012/0198050 A1 | 8/2012 | Maki et al. |
| 2012/0216239 A1 | 8/2012 | Yadav et al. |
| 2013/0042002 A1 | 2/2013 | Cheeniyil et al. |
| 2013/0110676 A1 | 5/2013 | Kobres |
| 2013/0125226 A1 | 5/2013 | Shah et al. |
| 2013/0174246 A1 | 7/2013 | Schrecker et al. |
| 2014/0047546 A1 | 2/2014 | Sidagni |

* cited by examiner

SYSTEM AND METHOD FOR DELIVERING A CHALLENGE RESPONSE IN AN AUTHENTICATION PROTOCOL

CROSS-REFERENCE TO RELATED APPLICATIONS

This application claims the benefit of U.S. Provisional Application No. 61/529,375, filed 31 Aug. 2011, titled "SYSTEM AND METHOD OF DELIVERING ACTIVE SCRIPTING VIA CHALLENGE-RESPONSE PROTOCOLS", which is incorporated in its entirety by this reference.

TECHNICAL FIELD

This invention relates generally to the authentication field, and more specifically to a new and useful system and method for delivering a challenge response in an authentication protocol in the authentication field.

BACKGROUND

Protocols such as RADIUS (Remote Authentication Dial In User Service) are commonly used for Authentication, Authorization, and Accounting management. Such protocols can be used to authenticate users or devices, authorize those users or devices for certain services, and account for the usage of those services. For example, to authenticate a user, a RADIUS client will send an Access-Request message to a RADIUS server containing proof of the user's identity (most commonly a username and password) and optionally information about the service to be accessed. The RADIUS server can reply to this Access-Request message with three types of responses: (1) if the RADIUS server deems that the user has not authenticated properly (eg. incorrect username or password) or is unauthorized to access the requested service, the RADIUS server can reply with an Access-Reject message; (2) if the RADIUS server deems the user has authenticated properly and is authorized, the RADIUS server can respond with an Access-Accept message; and (3) if the RADIUS server requires additional information from the user, it can reply with an Access-Challenge message. The last response type, the Access-Challenge message, is most commonly used to request additional information to authenticate the requesting user. Such information can include a password, PIN, token code, or other identifier attesting to the identity of the user. The RADIUS client will retrieve the requested information from the user and then relay it back to the RADIUS server to complete authentication. The challenge-response mechanism provided by the RADIUS Access-Challenge message is commonly used to implement two-factor authentication. In practice, a user attempting to log in to a service (eg. a VPN, website login, etc) will provide his primary credentials (eg. commonly a username and password), the RADIUS client will send those credentials in an Access-Request, the RADIUS server will validate the credentials and send an Access-Challenge back to the RADIUS client, the user will be challenged to enter a secondary factor of authentication (eg. commonly a one-time password (OTP) generated by a hardware or software token) and the response to that challenge will be sent to the RADIUS server for validation. Commonly, the challenge presented to the user in the form of a single instructional message (defined by the Reply-Message attribute in the Access-Challenge message) and an input box to collect the challenge response from the user. Unfortunately, this interface is often statically defined by the service (eg. a single input field with an optional textual caption) and does not provide a rich or interactive mechanism for the user to respond to the challenge. Thus, there is a need in the authentication field to create a new and useful system and method for delivering a challenge response in an authentication protocol. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

A System for Delivering a Challenge Response

Figure 1:
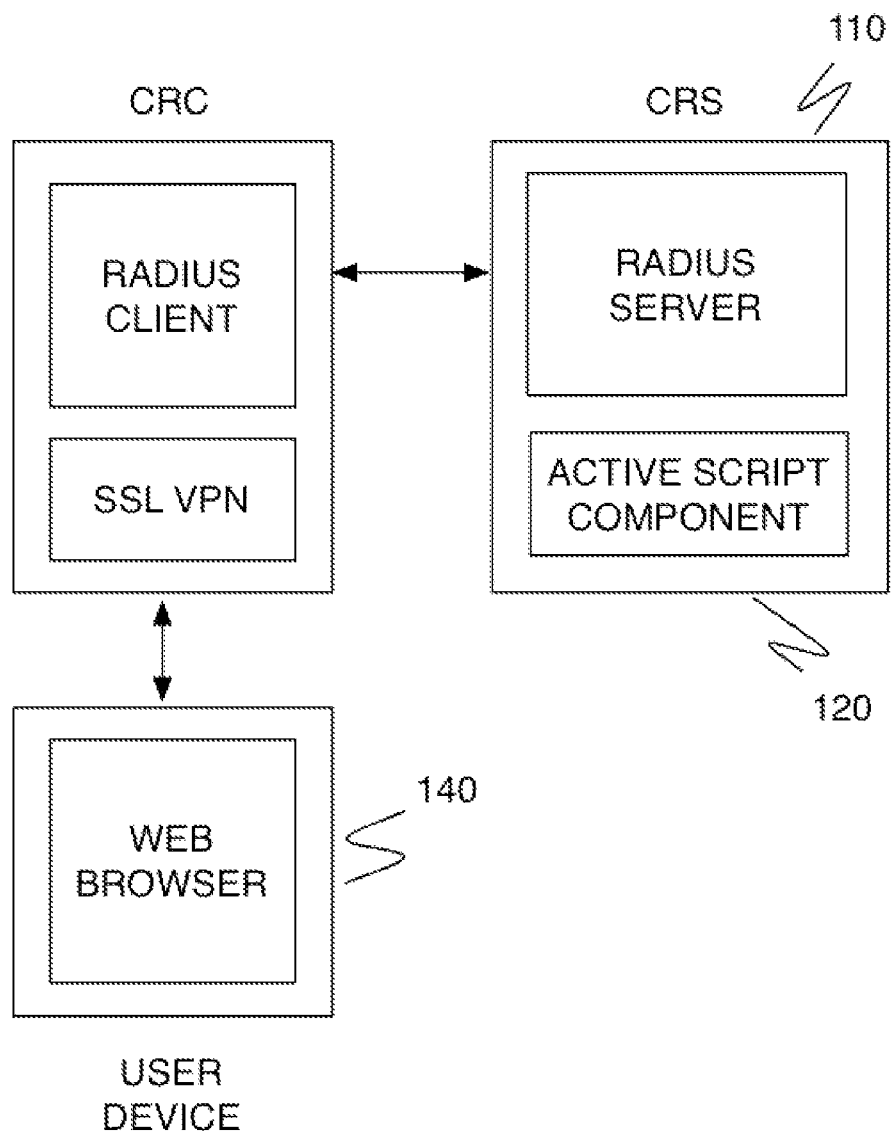
FIG. 1 is a schematic representation of a system of a first preferred embodiment of the invention.

As shown in FIG. 1, a system for delivering a challenge response of a preferred embodiment includes at least a challenge-response server (CRS) 110 and an active script component 120. The system functions to modify a client authentication interface of a network protocol. The system can preferably provide an interactive method of collecting the response of a user to a protocol-defined challenge (eg. RADIUS Access-Challenge) by delivering active scripting content (eg. Javascript) which is executed and rendered within the user's web browser when the challenge is received, instead of using the simple, static interface defined by the service (eg. SSL VPN, website login, etc) for collecting the response from the user. The invention enables a server to initiate a challenge crafted in such a way that enables the execution of active scripting component upon delivery to a web browser of a user. Upon execution, the active scripting component can modify the web page in which it is embedded to create a rich interactive interface to collect a response to the challenge. The system is preferably used to provide a richer and improved user experience when collecting a challenge response. The system may additionally include a challenge-response client (CRC) 130 and/or a user device 140. The system is preferably used alongside or integrated with a networking protocol that provides authentication, authorization and/or accounting management for device usage of a network service. The networking protocol is preferably a client/server protocol that runs in the application layer using the User Datagram Protocol (UDP) as transport, such as Remote Authentication Dial In User Service (RADIUS), but the may be used with any suitable protocol. The networking protocol may be used to manage access to the internet or internal networks, wireless networks, e-mail services. RADIUS servers are ubiquitous for providing authentication functionality, and the system preferably enables new interaction capabilities leveraging devices designed for integration with a RADIUS server.

The challenge-response server (CRS) 110 of a preferred embodiment functions to receive, process, and respond to access requests of networking protocol. The CRS 110 can be any software or hardware system that is involved in the authentication or authorization of a user or device. The CRS 110 preferably includes an input to receive an access-request message, challenge-response message, and any suitable messages. The CRS 110 can additionally preferably send access-accept messages, access-reject messages, access-challenge messages, challenge-accept messages, and/or any other suitable messages. The CRS 110 preferably includes a credential processing module to verify access request messages and credentials using any suitable authentication scheme. In response to a login or access-request from the challenge-response client (CRC) 130, the CRS 110 may deem that additional information is required from the User in order to authenticate or authorize the User. If the CRS 110 deems that a challenge is required, it may construct and deliver a challenge with an embedded active scripting component in its access-challenge message to the CRC 130. Typically, the CRS 110 is a RADIUS server as described above but the CRS 110 may alternatively be any suitable network authentication, authorization, or accounting protocol server.

The active scripting component 120 of a preferred embodiment functions to trigger execution of an interface on a user device 140. The active scripting component 120 is preferably included in a challenge response generated and communicated but the CRS 110. An active scripting component 120 may additionally or alternatively be included in any response from the CRS 110. The active scripting component 120 in one preferred embodiment is an embeddable script. The embeddable script is preferably Javascript that is configured to manipulate the Document Object Model (DOM) of a browser of a user, but the embeddable script may be any suitable executable code component. The embeddable script is preferably a static script that may be embedded in any challenge request. Alternatively the embeddable script may be a dynamically generated script. The CRS or other suitable device can preferably generate a customized embeddable script using parameters from the access-request such as user-name, location, or any suitable parameter. The active scripting component 120 of a second preferred embodiment is a script identifier that functions to trigger a pre-delivered script on a user device 140. The script identifier is preferably a unique code or identifier that is automatically detected by a script pre-delivered script, and the pre-delivered script preferably generates an interface to capture a user response to an access challenge message.

The system may additionally include a challenge-response client 130, which functions to prompt a user for authentication and communicating with the CRS 110 to validate credentials. The CRC 130 preferably hosts and/or protects a network service to which a user device is attempting to connect. The CRC 130 preferably relays the access protocol related communication between the CRS 110 and a user device 140. If the CRS 110 deems that a challenge is necessary, the CRC 130 will receive an access-challenge message, deliver the access-challenge to a user device 140, collect a user response to the access-challenge, and transmit the challenge-response back to the CRS 110. Typically, the CRC 130 contains the functionality of a RADIUS client to interact with the RADIUS Server (CRS) as well as a web server to interact over an HTTP/HTTPS protocol with the user device 140.

The system may additionally include a user device 140, which functions to initiate authentication, authorization, or accounting management request and to enable capture of input from a User. The user device is preferably a computing device such as a computer, mobile phone, tablet or any suitable computing device. The user device may additionally include a browser application through which a user (eg. person, device, etc) attempts to authenticate to a desired service hosted or protected by the CRC 130. The user device 140 preferably communicates a primary form of authentication (eg. a username and password) to the CRC 130, which is subsequently validated by the CRS 110. If the CRS 110 then deems that a challenge is necessary to collect additional information from the user device, the CRS 110 can issue a challenge with the active scripting component 120, which is delivered to the CRC 130, which may be passed down to the web browser of the user device 140. Upon delivery and execution of the active scripting component 120, a User would interact with the challenge interface constructed by the active scripting component and submit a response back to the CRC 130, to be validated by the CRS 110. Typically, a user device 140 is accessing the desired service via a web browser capable of executing and rendering the active scripting component that may be delivered by an access-challenge message sent from the CRS/CRC.

A Method for Delivering a Challenge Response

Figure 2:
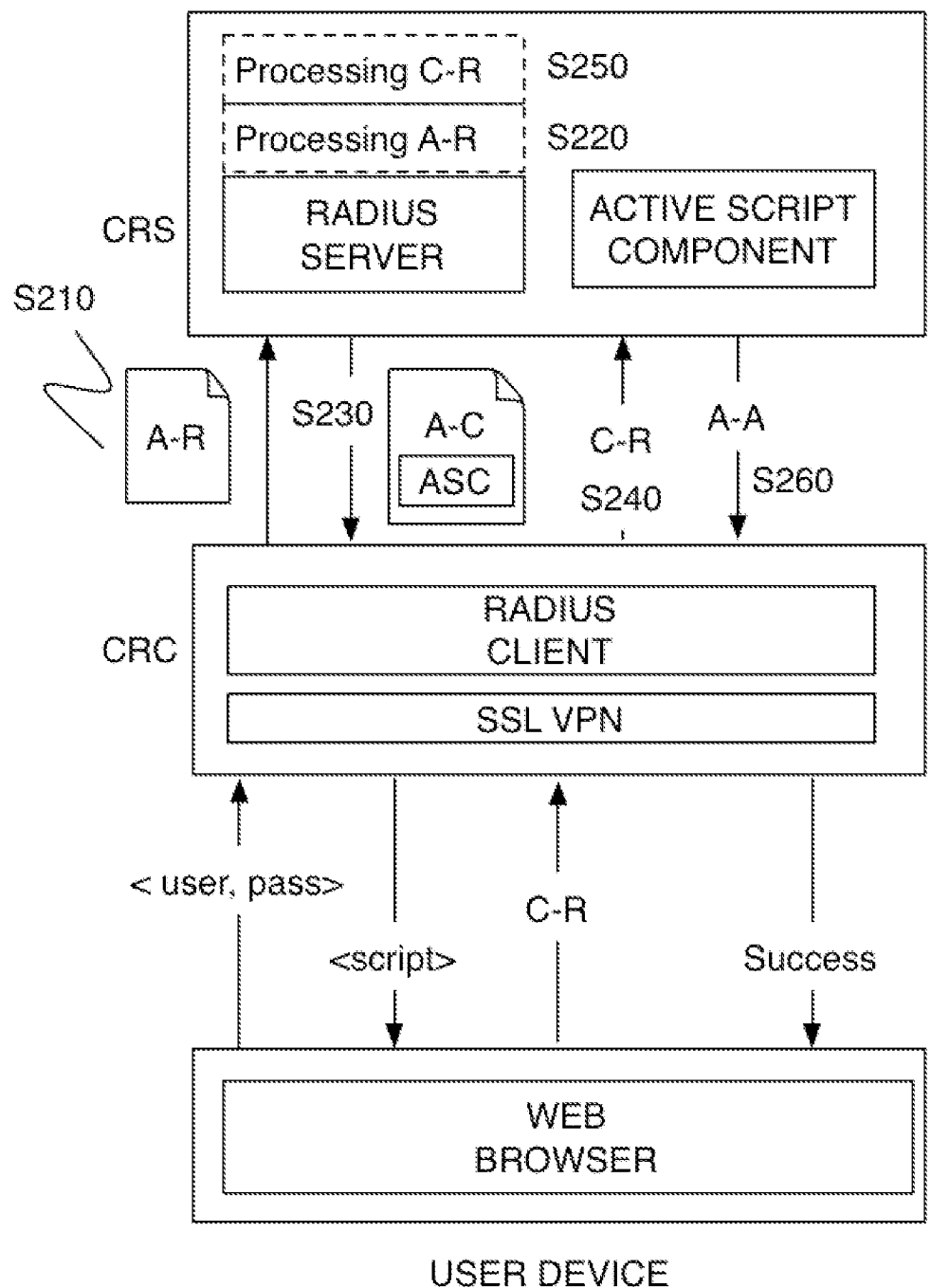
FIG. 2 is a schematic representation of a method of a first preferred embodiment of the invention.

As shown in FIG. 2, a method of a preferred embodiment may include receiving an access-request of a network protocol at a challenge-response server S210, determining if an access-challenge is required S220; delivering an active script component through a parameter of an access-challenge of the network protocol S230; receiving a challenge-response of a user device S240; validating the challenge-response S250; and selectively sending a reply according to the validity of the challenge-response S260. The method functions to modify a client authentication interface that relies on a network authentication, authorization, and/or access management protocol. The method preferably enables an improved, alternative, and/or otherwise altered authentication process for a user device. The method is preferably employed to generate an interface that captures user input during an access challenge portion of authentication, but the method may alternatively be employed to generate an interface at any suitable portion of authentication. The method is preferably implemented by a system substantially similar to the one described above. The method is preferably used on systems integrated with a networking protocol that provides authentication, authorization and/or accounting management for device usage of a network service. The networking protocol is preferably a client/server protocol that runs in the application layer using the User Datagram Protocol (UDP) as transport such as a Remote authentication Dial In User Service (RADIUS), but may alternatively be any suitable networking protocol. The networking protocol may be used to manage access to the internet or internal networks, wireless networks, e-mail services. RADIUS servers are ubiquitous for providing authentication functionality, and the system preferably enables new interaction capabilities leveraging devices designed for integration with a RADIUS server.

Step S210, which includes receiving an access-request of a network protocol at a challenge-response server (CRS), functions to receive a communication indicating that a user device is attempting to authenticate. The access-request is preferably relayed to the CRS by a challenge-response client (CRC). The CRC preferably initially received an access-request initiated by a user device. In an alternative embodiment, the method may additionally include communicating access credentials at a user device to a CRC and at the CRC relaying an access-request with the access credentials to the CRS. For example a user may attempt to log in to a SSL VPN server using a web browser. The user enters their primary credentials, typically a username and password, and transmits them to the SSL VPN server (i.e., CRC). The SSL VPN server utilizes a RADIUS client to verify the credentials received from the User by sending them in a RADIUS access-request to the RADIUS server (i.e., CRS).

Step S220, which includes determining if an access-challenge is required, functions to determine the response of the CRS and optionally generate an access-challenge with an active script component. Determining if an access challenge is required preferably includes processing the access-request to verify credentials and the CRS selectively replying with an access-accepted message for accepted credentials, an access-denied message if credentials are denied, or an access-challenge message if the CRS determines to challenge the credentials. Replying with an access-challenge message is preferably selected when the CRS requires additional information or action by a user to confirm the authentication, authorization, or account management request. In an exemplary embodiment, the method may have a RADIUS server (i.e., the CRS) verifying credentials of a user as relayed by the RADIUS client (i.e., the CRC). If the RADIUS server deems it is necessary to challenge the user, such as for a secondary authentication factor, the RADIUS server transmits a RADIUS Access-Challenge back to the RADIUS client as described in Step S230.

Figure 3:
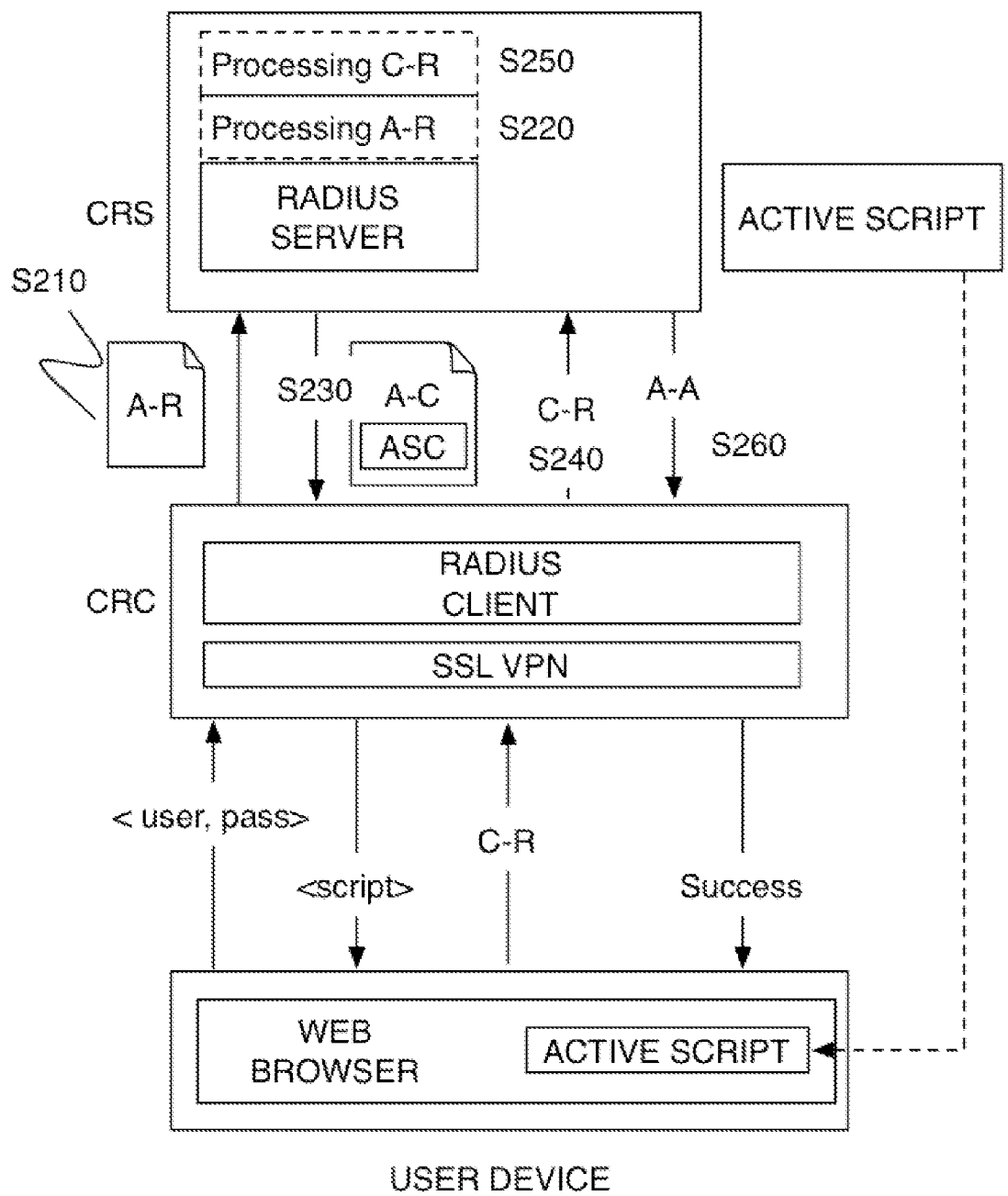
FIG. 3 is a schematic representation of a variation of a method embedding an active script identifier.

Step S230, which includes delivering an active script component through a parameter of an access-challenge of the network protocol, functions to include a component to enable a customized interface on a user device. The active script component is preferably embeddable Javascript, but may alternatively be any suitable embeddable script. The embeddable script is preferably configured to construct an arbitrary interface on a user device. More preferably, the embeddable script updates the document object model (DOM) of a browser. Delivering the active script component preferably includes inserting the active script component as string input in the reply-message parameter of the access challenge message. In the example where the method is employed with a RADIUS server, the reply-message is a text field that is used to hold the active script component. A RADIUS server may embed HTML script tags that contain Javascript code, that are configured to cause a web browser to execute the Javascript when it is delivered and rendered in the web browser. The rendered interface preferably facilitates completing the authentication step of the access-challenge. For example, the active scripting delivered to a web browser may construct an interface to a third-party service for authentication purposes, challenge the user to authenticate himself to that service, and then the service may generate and submit the value or identifier attesting to the identity of the User back to the CRC through the browser with assistance of the active scripting. Preferably the active scripting component is a static script file that may be used for a plurality of user devices. Delivering an active script component may alternatively include dynamically generating the active script component. A dynamically generated active script component may be dynamically generated according to the credential parameters, time of day, location information, or any suitable parameter. In another embodiment the active scripting component is a script identifier as shown in FIG. 3. The script identifier is preferably delivered in the reply message parameter similar to the executable code variation described above. A user device active script is preferably preprogrammed to recognize the script identifier upon delivery to a user device. The user device script is preferably Javascript that may be included in a webpage. The method may additionally include delivering the user device script. When this unique identifier is delivered to a user device (e.g., a web browser) in the reply-message, the user device active script detects this unique identifier and triggers the creation of the interface to collect user input in response to the challenge.

Step S240 and Step S250, which include receiving a challenge-response of a user device and validating the challenge-response, functions to determine if a response of a user satisfies the challenge. The challenge-response is preferably received at a CRS. Receiving a challenge-response of a user device may additionally include receiving a challenge-response at a CRC and communicating the challenge-response from the CRC to the CRS. The challenge-response preferably includes an input set according to the user response to the access-challenge message. The input may be directly set by the user (e.g., the challenge-response includes an answer supplied by the user) but the input may alternatively be generated in response to a response of the user (e.g., a signature indicating a user completed a challenge or created from a third party authentication service). The input preferably signifies the value of a single response but may additionally include values for a plurality of challenges. For example, one embodiment may generate several challenge questions and all the responses may be formatted in to a single input. Validating a challenge-response may be performed through any suitable technique. In one exemplary embodiment, after user interaction with the interface generated by the active scripting component, a response to a challenge by a user is transmitted to a SSL VPN (i.e., a CRC). The SSL VPN then transmits an access-request message to a RADIUS server (i.e., a CRS) through a RADIUS client component of the SSL VPN. The access-request preferably includes a challenge-response value relayed from the user.

Step S260, which includes selectively sending a reply according to the validity of the challenge-response, functions to determine if the challenge was successfully completed. Selective sending a reply according to the validity of the challenge response preferably includes sending access-accept reply for a valid challenge response and sending an access denied reply for an invalid challenge-response. Additionally the CRS may send a second access-challenge. For example, if a RADIUS server deems the challenge-response valid, it returns an access-accept response that is sent back to the RADIUS client. Upon receiving an access-accept response the SSL VPN preferably sets any suitable session state to indicate the user device has logged in successfully and optionally returning a success message to the user device.

A method of a preferred embodiment may additionally include at a user device rendering of the reply-message parameter of the access-challenge on the user device. Preferably, the reply-message is rendered in the context of a web browser, thereby executing the embedded active script payload (e.g., Javascript). The active script payload is then preferably free to manipulate the DOM structure of the web browser and construct arbitrary HTML elements and interactions with the User to collect their response to the challenge. For example, instead of simply displaying a static HTML input field and optional message derived from the reply-message, the Javascript rendered in the user's browser can create additional form input fields, pull in external resources, display arbitrary text, images, or media to the end user, etc. The method may additionally include receiving and processing secondary authentication communication from a rendered challenge interface. A secondary authentication system may cooperatively facilitate the receiving and processing of a secondary authentication communication. Any suitable form of secondary authentication may be performed. In one such exemplary application, this method can be used to take an existing static RADIUS challenge interface (e.g., hardcoded by the SSL VPN) which only displays a single HTML input box that the User inputs a one-time password into for secondary authentication, and modify that interface dynamically via the embedded Javascript payload into a rich interface for secondary authentication that allows the User to select between a number of secondary authentication factors and receive dynamic content and real-time feedback from the secondary authentication service.

An alternative embodiment preferably implements the above methods in a computer-readable medium storing computer-readable instructions. The instructions are preferably executed by computer-executable components preferably integrated with a challenge response server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for authenticating a user comprising:
receiving an access-request of a network protocol at a challenge-response server, wherein the network protocol is a client/server protocol running in the application layer and using a user datagram protocol as transport;
determining if an access-challenge message is required;
configuring an active script component to modify an existing static authentication interface of a user device;
delivering the active script component through a parameter of an access-challenge message of the network protocol when an access-challenge is required;
receiving a challenge-response of a user;
validating the challenge-response; and
selectively sending an access-accept response for a valid challenge-response and sending an access-denied response for an invalid challenge-response.

2. The method of claim 1, wherein determining if an access-challenge message is required includes processing the access-request to verify credentials; and the challenge response server selectively replying with an access-accepted message for verified credentials, an access-denied message if credentials are denied, and an access-challenge message if the credentials require a challenge to verify the credentials.

3. The method of claim 1, wherein the network protocol is a Remote Authentication Dial In User Service (RADIUS) protocol.

4. The method of claim 3, wherein delivering the active script component through a parameter of an access-challenge message of the network protocol includes delivering the active script component embedded in the reply-message field of the of the access-challenge message.

5. The method of claim 4, wherein the active script component is user executable code, and delivering an active script includes configuring the executable code to update an interface of a user device.

6. The method of claim 5, wherein configuring the executable code includes configuring the executable code to update the document object model of a browser window.

7. The method of claim 6, wherein configuring the executable code includes configuring the executable code to update an interface of a user device that collects input for the challenge-response.

8. The method of claim 7, further comprising receiving and processing secondary authentication communication from a rendered challenge interface.

9. The method of claim 3, wherein the active script component is an active script identifier; the method further comprising configuring user device executable code to detect the active script identifier and modify the interface of the user device; and delivering the user device executable code.

10. A method for authenticating network access comprising:
receiving an access-request of a network protocol at a challenge response server, wherein the network protocol is a client server protocol running in the application layer and using the User Datagram Protocol (UDP) as transport;
processing the access-request to verify credentials;
the challenge response server selectively replying with an access-accepted message for verified credentials, an access-denied message if credentials are denied, and an access-challenge message if the credentials require a challenge to verify the credentials;
configuring an active script component to transform an authentication interface of a user device;
wherein replying with an access-challenge message includes embedding the active script component in a parameter of the access-challenge;
receiving a challenge-response of a user;
validating the challenge-response; and
selectively sending an access-accept response for a valid challenge-response and sending an access-denied response for an invalid challenge-response.

11. The method of claim 10, wherein the network protocol is a Remote Authentication Dial In User Service (RADIUS) protocol.

12. The method of claim 11, further comprising at a user device, rendering the active script component in the reply-message parameter of the access-challenge message in the context of a browser.

13. The method of claim 12, wherein the active script component is user executable code, and delivering an active script.

14. The method of claim 11, wherein the active script component is an active script identifier; the method further comprising at a user device detecting the active script identifier and modifying the interface of the user device.

* * * * *